United States Patent [19]
Pérez C.

[11] Patent Number: 5,769,387
[45] Date of Patent: Jun. 23, 1998

[54] FLOW VALVES OPERATED BY FLOW TRANSFER MEANS WHICH REGULATE SMALL FLOWS OF CONTROL

[76] Inventor: Sergio Pérez C., Estado 235, Of 511, Santiago, Chile

[21] Appl. No.: 754,257

[22] Filed: Nov. 20, 1996

[51] Int. Cl.$^6$ ................................................ F16K 31/126
[52] U.S. Cl. ........................................ 251/61.4; 251/61.1
[58] Field of Search ................................. 251/61.1, 61.4, 251/61, 61.2, 63.5, 63.6; 137/522

[56] References Cited

U.S. PATENT DOCUMENTS

| | | |
|---|---|---|
| 3,493,008 | 2/1970 | Scaglione . |
| 3,689,025 | 9/1972 | Kiser ................................. 251/61.4 X |
| 4,221,361 | 9/1980 | Weingarten ........................ 251/61.1 X |
| 4,872,639 | 10/1989 | Gemignani ............................ 251/61.4 |
| 5,383,646 | 1/1995 | Weingarten ........................ 251/61.4 X |

*Primary Examiner*—Kevin Lee
*Attorney, Agent, or Firm*—Shlesinger Arkwright & Garvey LLP

[57] ABSTRACT

A flow valve operated by a flow transfer controller which regulates a small flow of control in order to produce a pressure differential between the sides of a sealing wall of a piston able to axially move between an open position far from the valve seat and a closed position in contact with the valve seat. The valve of the invention basically consists of a rigid valve body with an opening for a flow inlet and flow outlet. The body of the valve has a main cavity between the inlet and outlet of flow with the valve seat. The valve body comprises an elastomeric body located inside the main cavity to regulate the flow of fluid through the valve. The elastomeric body is hollow and open at an upper end and has a first sealing zone an a lower base of the elastomeric body. Control flow inlet and outlet ducts communicate with the hollow upper portion of the elastomeric body to actuate the valve.

24 Claims, 5 Drawing Sheets

FLOW VALVES OPERATED BY FLOW TRANSFER MEANS WHICH REGULATE SMALL FLOWS OF CONTROL

BACKGROUND OF THE INVENTION

1. Field of the Invention

The invention is concerned with flow valves operated by flow transfer means which regulate small flows of control in order to produce a pressure differential between the sides of the sealing wall of a piston able to axially move between an opened position far from the valve seat, and a closed position in contact with the valve seat.

2. Description of the Related Art

Among the great variety of flow valves commanded by pressure differentials, the following documents of patents can be mentioned: U.S. Pat. No. 2,980,385 of E. J. Hunter et al.; U.S. Pat. No. 3,493,008 of P. J. Scaglione. and the U.S. patent application Ser. No. 08/545,890 of S. Pérez, the same inventor of this valve.

U.S. Pat. No. 2,980,385 of Hunter discloses a valve which has a substantially hemispherical yieldable membrane, which walls shall be relatively thick, so that this membrane does not become locked at the flow outlets when pressures are very high in its concave portion. The excess thickness of the walls, on the contrary, prevents that the valve reacts before small pressure differentials, the valve being thus able to be permanently closed or being able to release a very small stream of flow, without releasing the required flow when a small opening of the valve is commanded.

U.S. Pat. No. 3,493,008 of Scaglione discloses a valve with an active element of valve made up of a disc cup and a metallic hermetically sealed, flexible type bellow. The walls of the metallic, flexible bellow are subject to the pressure differences on both sides of their faces, being able to become deformed if the internal pressure is higher than the external one, this forcing the design of a bellow with more resistant walls when operating at high pressures, thus a low sensitivity valve being obtained before small variations of pressure. On the other hand, the disc cup is basically rigid and its seal looses effectiveness with the valve seat when the flow of the line carries impurities. In addition, due to the structure of the valve, a substantial loss of load is produced.

Most of the state of the art valves which act by pressure differentials are complex as regards their structure with a great loss of load and they have little versatility with respect to the flow pressures in the line, that is to say, these valves must be designed in such a way to control the flows which are in a rather close range of pressures and loose their efficiency before great changes of pressure in the line.

The U.S. patent application Ser. No. 08/545,890 of Pérez shows a valve of the differential type which is sensitive to small changes of pressure and resistant to great working pressures, this being possible from a very simple design and with few components. This differential valve shows a rigid valve body with an opening for flow inlet and one flow outlet, which are oriented in a substantially cross way to said inlet opening. The body of the valve has a main cavity between the inlet and outlet of flow with a valve seat in the limit of the main cavity and the flow inlet. In addition, the body of the valve has ducts for the outlet of the control flow, which are associated with the control flow transfer means of the valve. The valve has an elastomeric body located inside the main cavity of the valve, said elastomeric body being hollow and opened in one of its axial ends, and with a central opening in its other end. This central opening allows the transfer of the control flow inlet to the cavity, this flow being of the same nature as the flow of the network in which the valve is operating.

Although this last kind of valve is very versatile and of simple design, it does not allow the use of a control flow different from that of the network, which is necessary in the case of automatically controlled facilities, or in facilities in which the control of great flows must be controlled through small signals. This invention has several of the components present in the U.S. application Ser. No. 08/545,890, but, unlike it, it has inlet means for the control flow which may be independent from the main flow of the network, thus a dynamics of operation being obtained for the valve which is totally different from that of the state of the art valves. Therefore, the valve of the invention allows the better regulation of the inlet control flow as compared with that of the U.S. patent application Ser. No. 08/545,890, since the latter does not allow to vary the flow, because the hole located in the sealing wall of its elastomeric body is of constant cross-section. This valve, on the other hand, allows to command a variation of the control flow externally to its inlet duct or ducts of the control flow.

SUMMARY OF THE INVENTION

The valve of the invention basically consists in a rigid valve body with an opening for flow inlet and one flow outlet, which are oriented in a substantially cross way to said inlet opening. The body of the valve has a main cavity between the inlet and outlet of flow with a valve seat in the limit of the main cavity and the flow inlet. In addition, the body of the valve has one or more ducts for the inlet of the control flow, and one or more ducts for the outlet of the same which are associated with the control flow transfer means of the valve. These inlet ducts of control flow may be supplied from a network which is independent from the main flow and flows of a nature different from that of the main flow can be used. Similarly, the outlet ducts of the control flow can discharge it in a network which is independent from the main one.

The valve has an elastomeric body in charge of regulating the flow by its opening or closing, depending on the difference of pressures produced between its walls, which are modified by the flow transfer means which control the flow. The elastomeric body is located inside the main cavity of the valve, said elastomeric body being hollow and open in one of its axial ends. This elastomeric body is made up of at least two coaxial zones: one sealing zone and one second zone of radial sealing. These zones of the elastomeric body perform specific functions during the operation of the valve, thus avoiding the participation of separate components, which is translated into a complex design of the valve and in an increase of the manufacture costs.

BRIEF DESCRIPTION OF DRAWINGS

For a better understanding of the invention, a description of the invention shall be given based on the drawings, where.

DETAILED DESCRIPTION OF INVENTION

Figure 1:
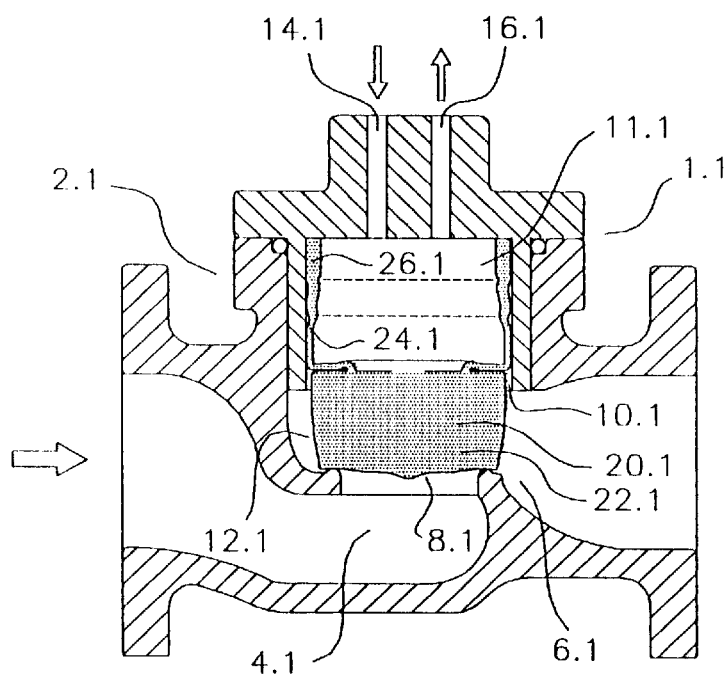
FIG. 1 shows a sectional elevational view of a first modality of the valve of the invention, in which it is closed.
Figure 2:
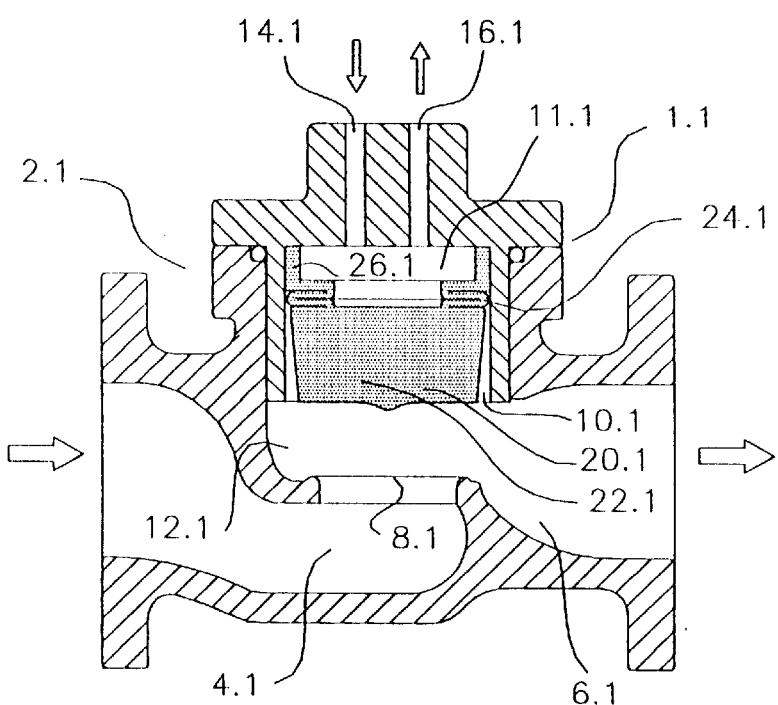
FIG. 2 is the same view as FIG. 1, but showing the valve opened.

FIGS. 1 and 2 show a first modality of the invention. Valve 1.1 is made up of a valve body 2.1 having an opening for the flow inlet 4.1 and a flow outlet 6.1 oriented in a substantially cross way to said flow inlet 4.1.

The valve body 2.1 has a valve seat 8.1 inside said flow inlet 4.1. Between the flow inlet 4.1 and the flow outlet 6.1, the valve body 2.1 has a main cavity 10.1 of constant section, cylindrical preferably, which is coaxially oriented to the flow inlet 4.1. This main cavity 10.1 has a ring-shaped broadening 12.1 in the zone which communicates with the flow outlet 6.1 over valve seat 8.1. On the other hand, the main cavity 10.1 is communicated in its farthest zone to the flow outlet 4.1 with one or more inlets of the control flow 14.1, and with one or more outlets of the control flow 16.1. The inlet or inlets of control flow 14.1 may be supplied through ducts carrying small flows directly from the flow inlet 4.1 or else from another point of the network, or else from a control network especially fitted for these purposes. Similarly, the outlet or outlets of control flow 16.1 may be directly discharged to the flow outlet 6.1 or else to a discharge network of the control flow, especially in the case that this is of a chemical or physical nature different from that of the flow of the main network in which valve 1.1 is operating.

Both the inlets of the control flow 14.1 and the outlets of the control flow 16.1 may be associated with traditional control valves, thus allowing to preset the control flow and modifying the sensitivity of valve 1.1 as shown below.

The valve 1.1 includes an elastomeric body 20.1 which is hollow and open in its upper base, with its constant cross section being of uniform geometry, although its area may vary longitudinally. This elastomeric body 20.1 is preferably cylindrical and is located inside the main cavity 10.1 of the valve body 2.1, becoming slightly compressed in the axial direction in order to exert a pressure on the valve seat 8.1. In this modality, this elastomeric body 20.1 is made up of three coaxial zones: a first sealing zone 22.1, a second zone of wall 24.1 and a third zone of radial zone 26.1.

The sealing zone 22.1 is located at the lower base of the elastomeric body 20.1 and is formed by a relatively thick mass body with a slightly lower section than the section of the main cavity 10.1 and with a slightly greater height than the ring-shaped broadening height 12.1 of said main cavity 10.1, so that this sealing zone 22.1 does not significantly collapse in the axial direction before the working pressures. The lower surface of the sealing zone 22.1 has a slightly greater section than the section of the valve seat 8.1 and the upper surface of said zone has a section which is equal to or greater than its lower surface.

The wall zone 24.1 is located in the intermediate section of the mantle of the elastomeric body 20.1 and is made up of a portion of wall which is relatively thin and its section is inferior to the section of the main cavity 10.1, this portion of the wall being liable to become buckled deformed radially, transmitting axial stresses before the pressures exercised inside said main cavity 10.1.

The zone of radial seal 26.1 acts on the side walls of the main cavity 10.1 and is forming the section of the open upper base of the elastomeric body 20.1. This zone of radial seal 26.1 is formed by portions of wall of a greater thickness than that of the zone of wall 24.1, which external surface has a similar geometry to that of the surface of the main cavity 10.1 in that sector, and its section is tight to the section of said main cavity 10.1.

FIG. 1 shows valve 1.1 in a closed condition. In this condition, when housing the elastomeric body 20.1, the main cavity 10.1 is covered by the wall zone 24.1 and by the radial seal zone 26.1 of it, forming a chamber 11.1 and a sealing is formed in the valve seat 8.1 through the sealing zone 22.1 of said elastomeric body 20.1, initially due to the axial compression exercised by the walls of the mantle of it (wall zone 24.1), because of its dimensional excess in the axial direction with respect to the height of the main cavity 10.1.

When valve 1.1 is closed and the flow floods the chamber 11.1 from the inlet of the control flow 14.1, and if the outlet of the control flow 16.1 is blocked (for example, through a traditional control valve not depicted herein), the pressure of the control flow exerts a resulting force which compresses the sealing zone 22.1 of the elastomeric body 20.1 against the valve seat 8.1, because the cross-section of said chamber 11.1 is greater than the cross-section of the valve seat 8.1, the sealing of the valve being thus increased.

When the flow which is held back by pressure in chamber 11.1 is discharged through the outlet of the control flow 16.1 (for example, because a control valve not depicted herein has been released), a decrease in the pressure of the control flow in chamber 11.1 is produced with respect to the pressure of the main flow which is acting in the lower side of the sealing zone 22.1 of the elastomeric body 20.1. The greater pressure of the flow in the external face of the sealing zone 22.1 of the elastomeric body 20.1—which is exerted from the flow inlet opening 4.1—produces a resulting axial force which displaces the sealing zone 22.1, moving it away from the valve seat 8.1, the wall zone 24.1 being collapsed, which is left exercising a greater restoring force in axial direction, which tends to overcome the force exerted by the flow pressure entering from the opening of the flow inlet 4.1. In this situation, with the elastomeric body 20.1 partially collapsed and far from the valve seat 8.1, the flow is able now to freely move from the inlet opening of flow 4.1 to the outlet opening of the flow 6.1 as depicted in FIG. 2.

In FIG. 2 valve 1.1 of the first modality of the invention is shown in open condition. In this condition, the chamber 11.1 has decreased its volume due to the collapsing of the wall zone 24.1. Depending on the flow which is transferred by the outlet of the control valve 16.1, the pressure in the chamber 11.1 may change, and with this, the separation between the sealing zone 22.1 and the valve seat 8.1 may also vary, thus varying the opening and closing degree of the valve 1.1. This allows to command the opening, closing and adjustment of the valve with greater accuracy and lesser energy.

When the control flow outlet 16.1 is totally or partially closed, a greater quantity of flow begins to enter from the control flow inlet 14.1 to the chamber 11.1, this increasing its volume of flow and lowering the sealing zone 22.1 moving the same closer to the valve seat 8.1, thus reducing the section of free passage of flow from the inlet opening of flow 4.1 to the outlet opening of flow 6.1 until closing, if the control flow outlet 16.1 is blocked.

Although in this first modality, the end of the radial sealing zone 26.1 of the elastomeric body 20.1 is free to move in axial direction from said main cavity, also a variant of valve can be considered in which said end of the radial sealing zone 26.1 is anchored to the wall of the main cavity 10.1 of the valve body 2.1, for example, through a bead molding or a ring-shaped projection in the external wall of said zone of radial sealing 26.1, which is held in the corresponding ring-shaped recess of said main cavity 10.1.

In the next modalities of the invention, all reference numbers which digits to the left of the decimal point are equal, point out similar elements of the invention. The digit to the right of the decimal point indicates the number of the modality being described. Therefore, the reference 20.1 indicates the elastomeric body of the first modality, while reference 20.2 indicates the elastomeric body of the second modality.

Figure 3:
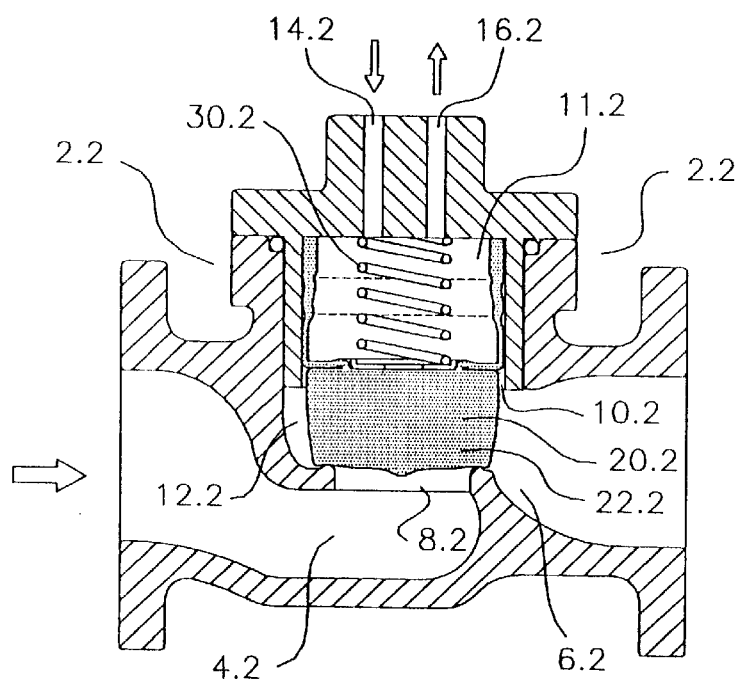
FIG. 3 shows a sectional elevational view of a second modality of the valve of the invention, in which it is closed.
Figure 4:
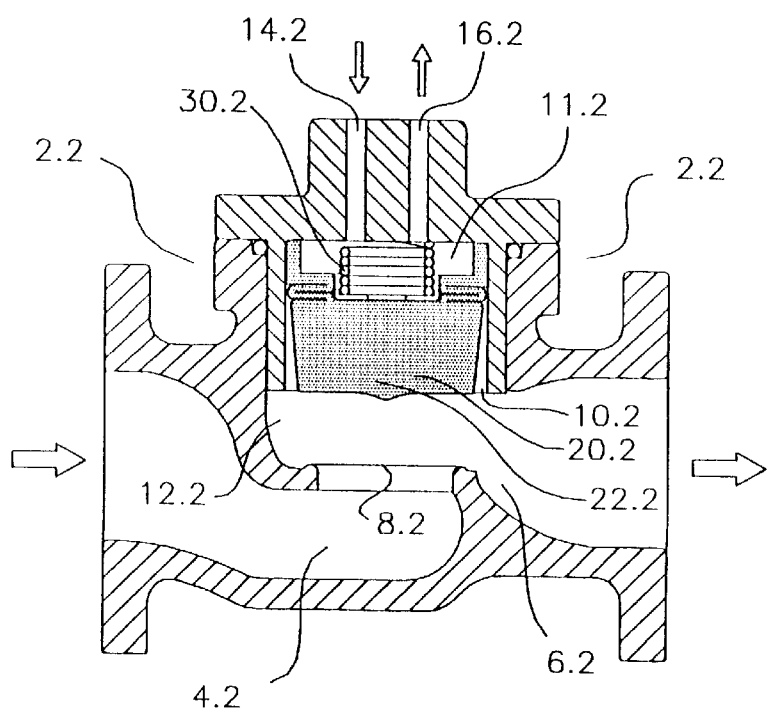
FIG. 4 is the same view as FIG. 3, but showing the valve opened.

FIGS. 3 and 4 depict a second modality of the invention in closed and open position, respectively. This modality is a variant of the first modality depicted in FIGS. 1 and 2, but a compressing spring 30.2 has been included inside the chamber 11.2, initially being lightly compressed between the upper surface of the sealing zone 22.2 and the upper surface of the main cavity 10.2 of the valve body 2.2. This compressing spring 30.2 allows the use of the valve in flow networks of greater pressure. The description of the elements and their operation is quite similar to that already explained with respect to the first modality of the invention.

In a way similar to the generalization mentioned for the case of the first modality, also a variant of valve 1.2 can be considered in which the end of the radial sealing zone 26.2 is anchored to the wall of the main cavity 10.2 of the valve body 2.2, for example, through a bead molding or a ring-shaped projection in the external wall of said zone of radial sealing 26.2, which is held in the corresponding ring-shaped recess of said main cavity 10.2.

Until now, modalities have been considered in which the valve of the invention has an elastomeric body inside 20.$x$ which can be totally movable in its axial direction or else be anchored or solidary in its radial sealing zone 26.$x$ with the wall of the main cavity 10.$x$ of the valve body 2.$x$. Also, it has been considered that in the chamber 11.$x$, a compressing ring 30.$x$ can be housed.

Figure 5:
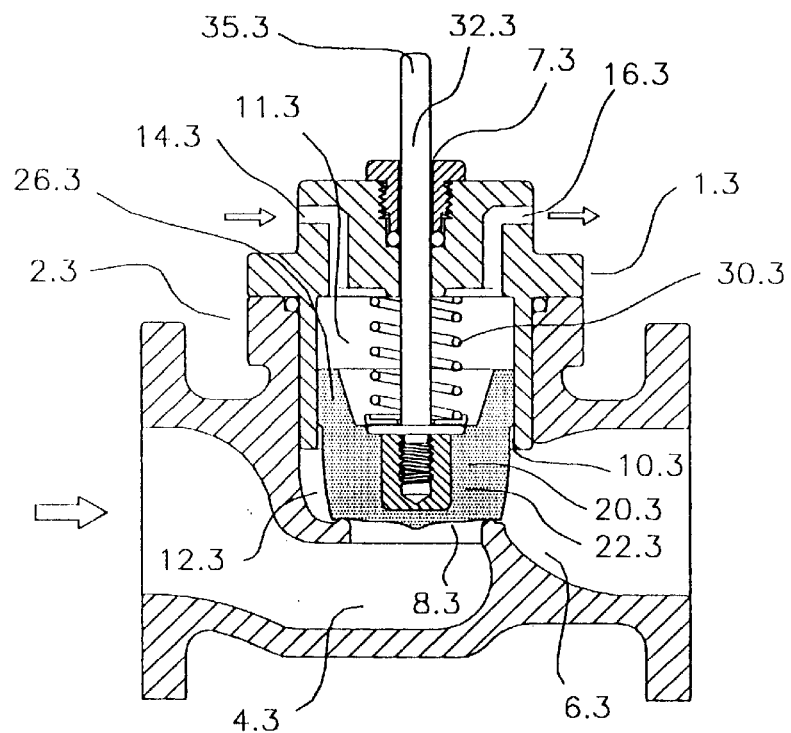
FIG. 5 shows a sectional elevational view of a third modality of the valve of the invention, in which it is closed.
Figure 6:
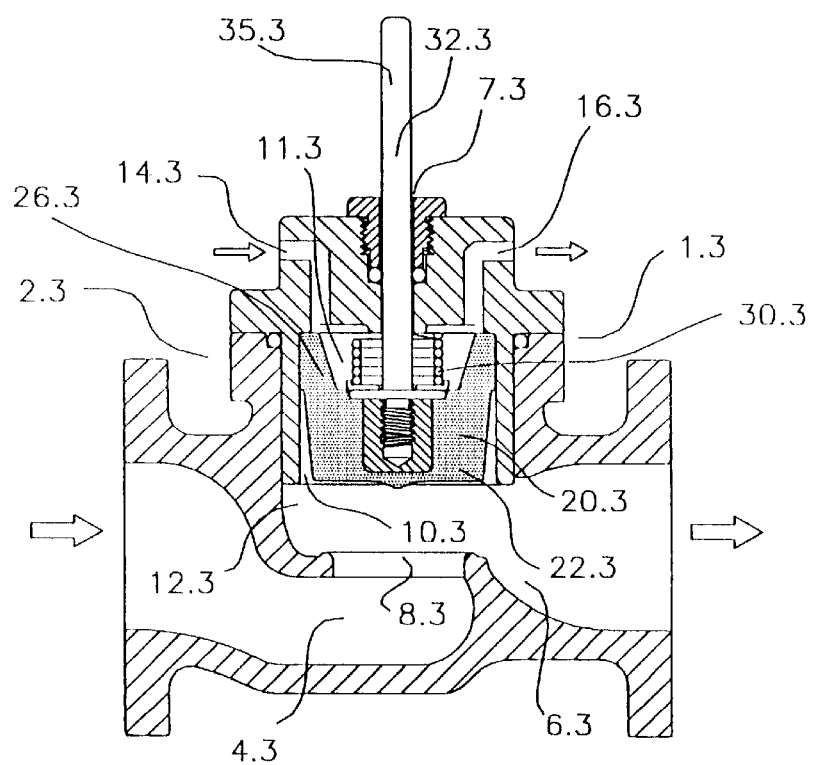
FIG. 6 is the same view as FIG. 5, but showing the valve opened.

In the third modality of the valve of the invention, depicted in FIGS. 5 and 6, two types of differences are included as compared with the preceding modalities, which are not necessary to be found together. These differences are basically an elastomeric body without a zone of wall (reference 24.$x$ in some other modalities) and mobile axial stem.

As already mentioned, this modality is provided with a fixed axial stem, which is mobile with respect to the valve body, and anchored to the sealing zone of the elastomeric body at the bottom, which serves as guide to the displacement of the elastomeric body. The free end of the mobile stem, when projecting outwards of the valve body, may command other devices, or else, may be externally operated in order to control the displacement of the elastomeric body of the valve.

The valve 1.3 is made up of a valve body 2.3 having an inlet opening for the flow 4.3 and a flow outlet 6.3 which is oriented in a substantially cross way to said flow inlet 4.3.

The valve body 2.3 has a valve seat 8.3 inside said flow inlet 4.3. Between the flow inlet 4.3 and the flow outlet 6.3, the valve body 2.3 has a main cavity 10.3 of constant section, cylindrical preferably, which is coaxially oriented to the flow inlet 4.3. This main cavity 10.3 has a ring-shaped broadening 12.3 in the zone which communicates with the flow outlet 6.3 over valve seat 8.3. On the other hand, the main cavity 10.3 is communicated in its farthest zone to the flow outlet 4.3 with one or more inlets of the control flow 14.3 and with one or more outlets of the control flow 16.3. In this farthest zone to the flow inlet 4.3, in the valve body 2.3, also a hole 7.3 can be found for the passing of the free end of the mobile axial stem 32.3. which projects outwards of the valve body 2.3, said hole 7.3 having proper means to ensure the watertightness of the surrounding flow, for example, through O-Rings.

The inlet or inlets of control flow 14.3 may be supplied through ducts carrying small flows directly from the flow inlet 4.3 or else from another point of the network, or else from a control network especially fitted for these purposes. Similarly, the outlet or outlets of control flow 16.3 may be directly discharged to the flow outlet 6.3 or else to a discharge network of the control flow, especially in the case that this is of a chemical or physical nature different from that of the flow of the main network in which valve 1.3 is operating.

The valve 1.3 includes an elastomeric body 20.3 which is hollow and open in its upper base, with its constant cross section being of uniform geometry, cylindrical preferably, and is located inside the main cavity 10.3, and it also includes a compressing spring 30.3 interlocked between said elastomeric body and the upper wall of the main cavity 10.3 of the valve body 2.3, so that this spring 30.3 becomes slightly compressed in the axial direction, so that the base of the elastomeric body 20.3 exerts a pressure on the valve seat 8.3. In the main cavity 10.3, a chamber 11.3 is defined by the elastomeric body 20.3 being housed in it.

The elastomeric body 20.3 of this modality is made up of two coaxial zones (although it could be made up of the three zones already described in relation to the first modality, and in which case, it can have the compressing ring 30.3 or not): a first sealing zone 22.3, and a second zone of radial sealing zone 26.3.

The sealing zone 22.3 is located at the lower base of the elastomeric body 20.3 and is formed by a relatively thick mass body with a slightly lower section than the section of the main cavity 10.3 and with a slightly greater height than the ring-shaped broadening height 12.3 of said main cavity 10.3, so that this sealing zone 22.3 does not significantly collapse in the axial direction before the working pressures. The lower surface of the sealing zone 22.3 has a slightly greater section than the section of the valve seat 8.3 and the upper surface of said zone has a section which is equal to or greater than its lower surface.

The zone of radial seal 26.3 acts on the side walls of the main cavity 10.3 and is forming the section of the open upper base of the elastomeric body 20.3.

A mobile axial stem 32.3 is solidary or axially anchored to the upper wall of the sealing zone 22.3 of the elastomeric body 20.3 and its free end 35.3 projects outwards of the valve body 2.3, passing through the hole 7.3.

FIG. 5 depicts valve 1.3 in a closed condition and with flow in its inlet line (4.3). For the valve 1.3 becoming closed (or begins to close from a condition of opened valve), it shall occur that the resulting force between the force exerted by the spring 30.3 and the force exerted by the pressure of the control flow over the upper face of the sealing zone 22.3 is greater than the force exerted over the lower side of the sealing zone 22.3 due to the pressure of the main flow coming from the inlet opening 4.3. As the areas of not one of the two sides of the sealing zone 22.3 are being modified, then the greater force applied over its upper side in order to keep valve 1.3 in its closed condition or to be closed, shall come from an increase of the pressure of the control flow in the chamber 11.3. In order to get an increase in the pressure of the control flow in the chamber 11.3, at least one of the following actions must take place: increase of pressure in the control flow supply line (14.3), or decrease of the discharge volume of the control flow (16.3).

In FIG. 6 valve 1.3 is depicted in open condition and with flow both in its inlet line (4.3) and in its outlet line (6.3.). For the opening of valve 1.3 and for this condition to be kept, the resulting between the spring force 30.3. and the force produced by the pressure of the control flow present in the chamber exerts a lower force than the force exerted by the pressure of the main flow (coming from the inlet to opening 4.3) on the lower side of the sealing zone 22.3. In order to get a reduction in the pressure of the control flow in the chamber 11.3, at least one of the following actions shall occur: decrease of pressure in the supply line of the control flow (14.3); or increase of the discharge volume of the control flow (16.3).

Also a momentary opening of the valve 1.3 can be obtained by axially displacing the axial stem 32.3 in order to move the elastomeric body 20.3 from the valve seat 8.3. Because the pressure in the chamber 11.3 has not decreased, that is to say, this pressure continues to be of the same rate as that which kept the valve in closed condition, then, when released to the axial stem 32.3 the resulting of the forces over the upper side of the sealing zone 22.3 continues to be greater than the force exerted by the pressure of the main flow over the lower side of the sealing zone 22.3, thus causing the elastomeric body 20.3 to go down.

Figure 7:
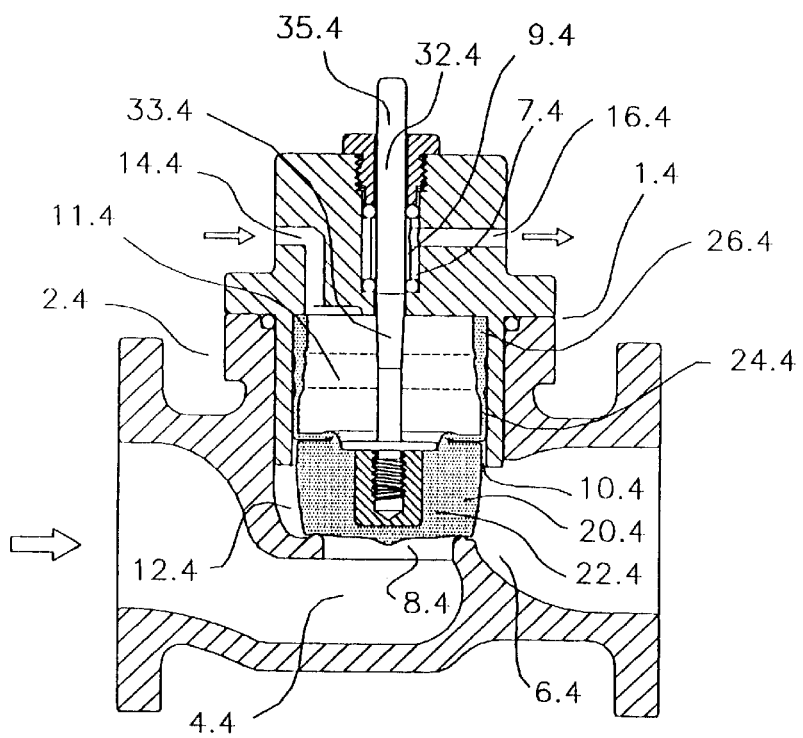
FIG. 7 shows a sectional elevational view of a fourth modality of the valve of the invention, in which it is closed.
Figure 8:
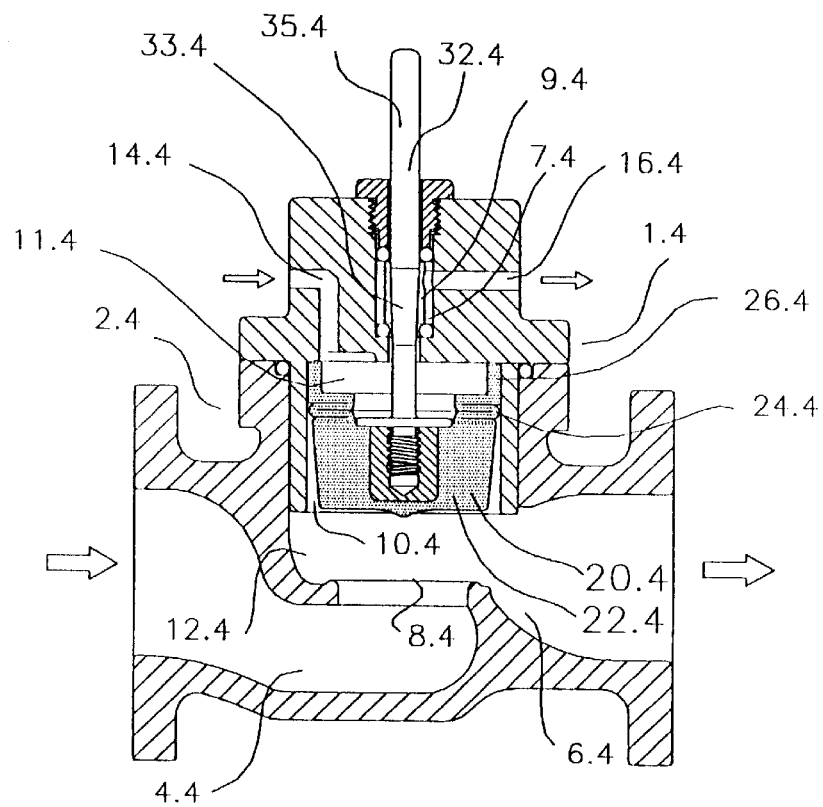
FIG. 8 is the same view as FIG. 7, but showing the valve opened.

FIGS. 7 and 8 depict a fourth modality of the invention in closed and open position, respectively. In this modality, the valve is provided with a mobile axial stem with respect to the valve body and anchored at the bottom to the sealing zone of the elastomeric body. In particular, the mobile stem allows to define transfer means of the control flow, whether at the inlet of the control flow to the chamber, or else, from the chamber to the outlet of the control flow. The mobile stem acts as guide for the displacement of the elastomeric flow. The free end of the mobile stem, when projecting outwards of the valve body, may command other devices, or else, it may be externally operated in order to control the displacement of the elastomeric body of the valve.

Below, the fourth modality of the invention shall be detailed with a mobile stem designed for the transfer of the control flow to be carried out from the chamber to the outlet of the control flow. The valve 1.4 is made up of a valve body 2.4 having an inlet opening for the flow 4.4 and a flow outlet 6.4 which is oriented in a substantially cross way to said flow inlet 4.4.

The valve body 2.4 has a valve seat 8.4 inside said flow inlet 4.4. Between the flow inlet 4.4 and the flow outlet 6.4, the valve body 2.4 has a main cavity 10.4 of constant section, cylindrical preferably, which is coaxially oriented to the flow inlet 4.4. This main cavity 10.4 has a ring-shaped broadening 12.4 in the zone which communicates with the flow outlet 6.4 over valve seat 8.4. On the other hand, the main cavity 10.4 is communicated in its farthest zone to the flow inlet 4.4 with one or more inlets of the control flow 14.4. In this farthest zone to the flow inlet 4.4, in the valve body 2.4 there is also an opening for the outlet of the control flow 7.4 and which communicates with a secondary chamber 9.4 which may be discharged through one or more outlets of the control flow 16.4.

The inlet or inlets of control flow 14.4 may be supplied through ducts carrying small flows directly from the flow inlet 4.4 or else from another point of the network, or else from a control network especially fitted for these purposes. Similarly, the outlet or outlets of control flow 16.4 may be directly discharged to the flow outlet 6.4 or else to a discharge network of the control flow, especially in the case that this is of a chemical or physical nature different from that of the flow of the main network in which valve 1.4 is operating.

The valve 1.4 includes an elastomeric body 20.4 with its constant cross section of a uniform geometry, cylindrical preferably, which is hollow and open in its upper base, the same being located inside the main cavity 10.4, so that it is lightly compressed in the axial direction in order to exert a force on the valve seat 8.4. In the main cavity 10.4, a chamber 11.4 is defined when the elastomeric body 20.4 is housed.

The elastomeric body 20.4 of this modality is made up of three coaxial zones: a first sealing zone 22.4, a second zone of thin wall 24.4 and a third zone of radial zone 26.4.

The sealing zone 22.4 is located at the lower bottom of the elastomeric body 20.4 and is formed by a relatively thick mass body with a slightly lower section than the section of the main cavity 10.4 and with a slightly greater height than the ring-shaped broadening height 12.4 of said main cavity 10.4, so that this sealing zone 22.4 does not significantly collapse in the axial direction before the working pressures. The lower surface of the sealing zone 22.4 has a slightly greater section than the section of the valve seat 8.4 and the upper surface of said zone has a section which is equal to or greater than its lower surface.

The wall zone 24.4 is located in the intermediate section of the mantle of the elastomeric body 20.4 and is made up of a portion of wall which is relatively thin and its section is inferior to the section of the main cavity 10.4, this portion of the wall being liable to become buckled and transmit axial stresses before the pressures exercised inside said main cavity 10.4.

The zone of radial seal 26.4 acts on the side walls of the main cavity 10.4 and is forming the section of the open upper base of the elastomeric body 20.4. This zone of radial seal 26.4 is formed by portions of wall of a greater thickness than that of the zone of wall 24.4, which external surface has a similar geometry to that of the surface of the main cavity 10.4 in that sector, and its section is tight to the section of said main cavity 10.4.

In this fourth modality of the invention, the valve 1.4 has an axial mobile stem 32.4, which is solidary or is axially anchored to the upper wall of the sealing zone 22.4 of the elastomeric body 20.4, and projecting outwards of the valve body 2.4, going through the opening for the outlet of the control flow 7.4 and of the secondary chamber 9.4, thus a driving end 35.4 being defined for the mobile axial stem 32.4. In both ends of the secondary chamber 9.4, through which the axial mobile stem 32.4 goes through, there are sealing means such as O-Rings in order to secure the watertightness.

The mobile axial stem 32.4 has a section to regulate the volume of the control flow 33.4, which cross-section is of a variable size in the axial direction, the shape of said cross-section being equal to the shape of the opening for the outlet of the control flow 7.4, so that this regulation section 33.4 obstructs said opening 7.4 totally or partially, thus modifying the volume of the control flow going out of the chamber 11.4 to the secondary chamber 9.4.

FIG. 7 depicts the valve 1.4 in a closed condition and with flow in its inlet line (4.4). For the valve 1.4 becoming closed (or begins to close from a condition of opened valve), it shall occur that the pressure of the control flow present in the chamber 11.4 exerts a force which is greater than the force exerted over the lower side of the sealing zone 22.4 due to the pressure of the main flow coming from the inlet opening 4.4. As the areas of not one of the two sides of the sealing zone 22.4 are being modified, then the greater force applied over its upper side in order to keep valve 1.4 in its closed condition or to be closed, shall come from an increase of the pressure of the control flow in the chamber 11.4. In order to get an increase in the pressure of the control flow in the chamber 11.4, at least one of the following actions must take place: increase of pressure in the control flow supply line (14.4), or decrease of the discharge volume of the control flow (16.4). When the section to regulate the volume of the control flow 33.4 of the mobile axial stem 32.4 is located so that its cross-section of greater area is interlocked in the opening for the outlet of the control flow 7.4, then a lower volume of the control flow shall be discharged from the chamber 11.4 to the secondary chamber 9.4 and from the latter to the outlet of the control flow 16.4, thus the pressure in the chamber 11.4 being increased. Under these circumstances, the compression of the sealing zone 22.4 is kept against the valve seat 8.4, if the valve 1.4 was initially closed or else, the elastomeric body 20.4 goes down until compressing the sealing zone 22.4 against the valve seat 8.4 in the case that the valve 1.4 was initially opened.

FIG. 8 depicts the valve 1.4 in an opened condition and with flow both in its inlet line (4.4) and in its outlet line (6.4). For the valve 1.4 becoming opened and kept said condition, it shall occur that the pressure of the control flow present in the chamber 11.4 exerts a force which is lower than the force exerted over the lower side of the sealing zone 22.4 due to the pressure of the main flow coming from the inlet opening 4.4. In order to get a reduction in the pressure of the control flow in the chamber 11.4, at least one of the following actions must take place: reduction of pressure in the control flow supply line (14.4), or increase of the discharge volume of the control flow (16.4). When the section to regulate the volume of the control flow 33.4 of the mobile axial stem 32.4 is located so that its cross-section of lower area is interlocked in the opening for the outlet of the control flow 7.4, then a lower volume of the control flow shall be discharged from the chamber 11.4 to the secondary chamber 9.4 and from the latter to the outlet of the control flow 16.4, thus the pressure in the chamber 11.4 being reduced. Under these circumstances, the elastomeric body 20.4 goes up until totally releasing its sealing zone 22.4 of the valve seat 8.4.

Also a momentary opening of the valve 1.4 can be obtained by axially displacing the axial stem 32.4 in order to move the elastomeric body 20.4 from the valve seat 8.4, but for this opening not to be permanent, the pressure in the chamber 11.4 must not decrease, this being why the stem shall be momentarily displaced, so that its section to regulate the volume 33.4 interlocks a cross-section of an area slightly lower, equal or greater than the area interlocked when the valve 1.4 is closed.

Figure 9:
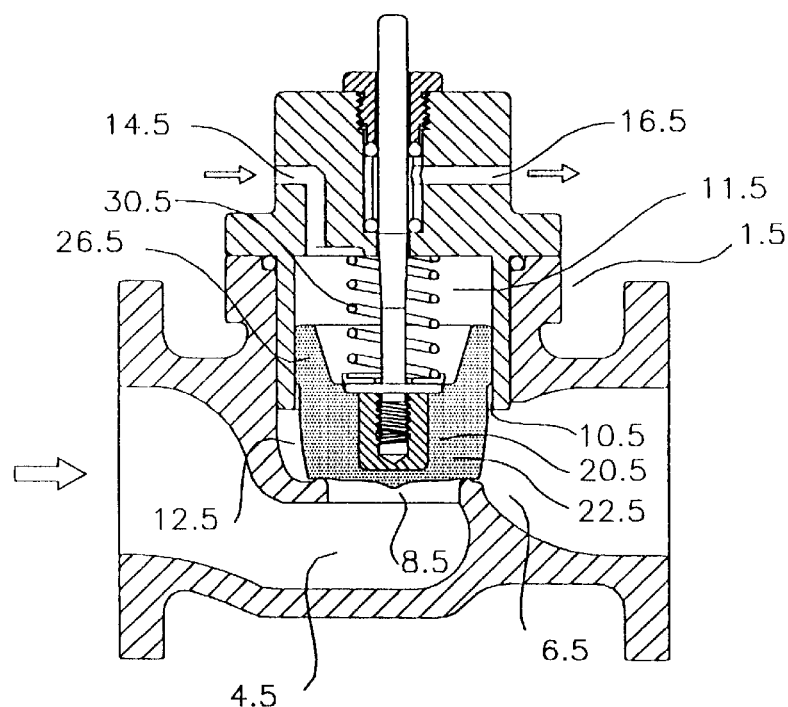
FIG. 9 shows a sectional elevational view of a fifth modality of the valve of the invention, in which it is closed.
Figure 10:
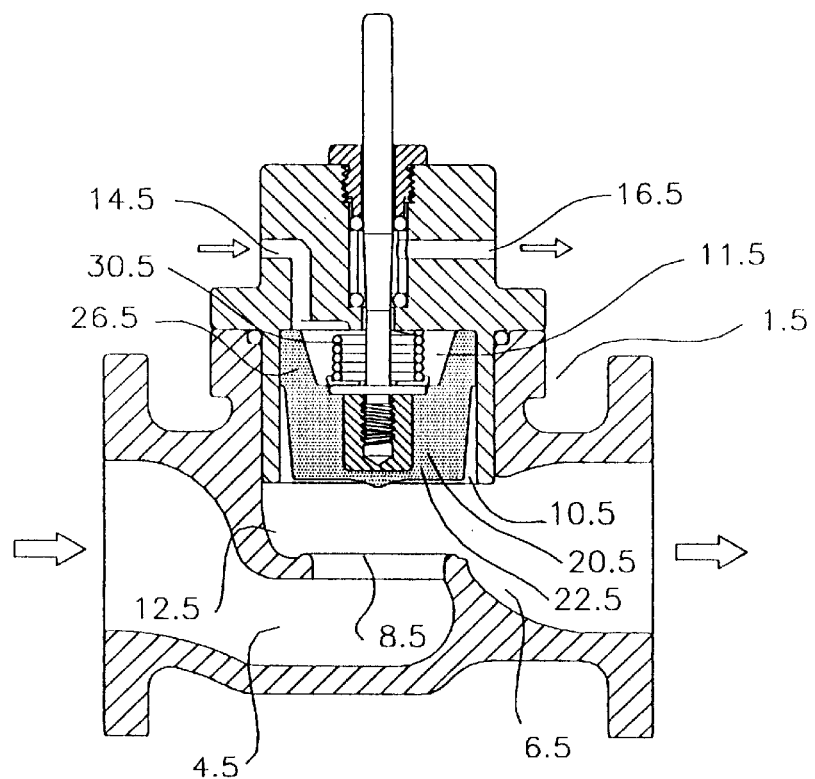
FIG. 10 is the same view as FIG. 9, but showing the valve opened.

FIGS. 9 and 10 depict a fifth modality of the invention in closed and open position, respectively. In this modality, the valve is similar to that of the fourth modality, but the elastomeric body 20.5 is made up of only two coaxial zones: a first sealing zone 22.5 and a second zone of radial sealing 26.5, which have the same characteristics as those described in relation to the other modalities.

Since the elastomeric body 20.5 of this modality lacks the wall zone which is present in some of the preceding modalities (reference 24.$x$), its function is supplied by a compressing spring 30.5 in order to keep the valve closed when there is no flow in the network. This spring 30.5 becomes housed in the chamber 11.5 and in a slightly compressed condition between the upper surface of the sealing zone 22.5 and the upper surface of the main cavity 10.5 of the valve body 2.5, thus allowing the use of the valve in networks of flow with greater pressures.

The invention has been described based on five preferred modalities, in which different combinations of some of its components have been considered. In all modalities there is a control flow inlet 14.$x$ to the chamber 11.$x$ of the valve body 2.$x$, limited in one of its ends by the elastomeric body 20.$x$, which closes or opens the pass of the main flow of the valve 1.$x$, depending on the fact that it is in contact with the valve seat 8.$x$ or not. Also in all modalities there is a control flow outlet 16.$x$ which allows the outlet of this flow from the chamber 11.$x$. In all cases, the inlet of the control flow 14.$x$ may be supplied with the same main flow of the network (for example through a duct of flow intake from the inlet of the main flow 4.$x$) or else from other sources, whether they are using the same kind of main flow or another one, and whether the flow is in similar physical conditions to that of the main flow or else it is under different conditions (pressure, temperature, etc.). Similarly, the outlet of the control flow 16.$x$ may be discharged whether directly at the outlet of the main flow 6.$x$ (in case that the control flow is of the same nature as the main one) or to a secondary network, for example, in order to distribute only the control flow.

A particular case, which shall be considered included in this invention, is that the inlet and outlet of the control flow (14.$x$ and 16.$x$, respectively) share one single duct of communication with the chamber 11.$x$, joint to it through a proper valve, such as a three-way valve or that operative equivalent.

In all modalities of the invention there is also an elastomeric body 20.$x$ in common at least with two of its three possible axial zones. These two zones common to all modalities are: one sealing zone in an end, and one zone of radial sealing in the other end. In some modalities, it can be a zone of thin wall which is intermediate to the other ones.

In case that the elastomeric body 20.$x$ is made up of only two zones (a sealing one 22.$x$ and a radial sealing 26.$x$), the compressing spring 30.$x$ shall be always present in order to contribute the necessary restoring forces to produce the sealing of the valve, when the pressure in the chamber is reduced. The compressing spring 30.$x$ also allows to reduce the negative effect of the water hammer produced in the line, thus reducing the flow leaks which, on the contrary, would be produced due to the sudden increase of the pressure which acts on the external surfaces of the elastomeric body subject to the flow entering.

When the zone of thin wall 24.$x$ exists in the elastomeric body 20.$x$, there may be a compressing spring 30.$x$ or not in the valve chamber 11.$x$, exerting a force which tends to compress the sealing zone 22.$x$ against the valve seat 8.$x$. In this same case in which the elastomeric body 20.$x$ is made up of three axial zones, this elastomeric body may be fixed to the valve body 2.$x$ in its zone of radial sealing 26.$x$ or free in its two ends.

In the cases in which the elastomeric body 20.*x* has its zone of radial sealing 26.*x* free, the internal surface of the zone of radial sealing may be cylindrical or prismatic, trunk-conical (or trunk-pyramid) or inverted trunk-conical (or inverted trunk-pyramid), depending on the fact that a pressure inside the chamber 11.*x* shall exert a resulting force which does not affect the displacement of the zone of radial sealing, or else that the resulting force displaces the zone of radial sealing upwards, or else that the resulting force displaces the zone of radial sealing downwards, respectively.

In the case that the modalities of the invention has an axial stem 32.*x* including a section to regulate the volume of the control flow 33.*x*, the stem may be fixed to the upper surface of the sealing zone 22.*x* of the elastomeric body 20.*x* in a relatively rigid way, or else in a relatively displaceable way. In this last case, the axial stem 32.*x* shall be assembled in such a way that when operated from the outside, the same may be initially displaced in a predetermined section without displacing the elastomeric body 20.*x* in order to interlock its regulation section 33.*x* with a predetermined section against the opening for the outlet of the control flow 7.*x* without that, initially, the valve is opened, but the pressure of the chamber 11.*x* is released, this variation of pressure starting the opening of the valve. This relatively displaceable link between the axial stem 32.*x* and the sealing zone 22.*x* may be carried out for example through a longitudinal groove located in the lower end of the stem, through which a stem anchored to said sealing zone shall go. Since this link can be got in many ways, the same has not been depicted in the figures.

On the other hand, the valves of the invention may not have the axial stem 32.*x*. In the case that there is the axial stem 32.*x*, it can have a section to regulate the volume of the control flow 33.*x* (see modalities 4 and 5), in which case the body of the valve 2.*x* is equipped with one secondary chamber 9.*x* from which the control flow is discharged to the outlet of the control flow 16.*x*.

Any of the modalities of the invention can have secondary valves of regulation and/or control provided at the inlet of the control flow 14.*x* or at the outlet of the control flow 16.*x*, or at both of them.

An obvious variant of the invention may consist in providing the external perimetrical mantle of the sealing zone of the elastomeric body with a coating of rigid material, such as, for example, a tight metallic ring, which shall avoid the increase of the section of said sealing zone, when the pressure in the chamber of the valve significantly increases. The sealing zone can also have internal reinforcements, as for example metallic or rayon fibers, among others.

Still another obvious variant of the invention may consist in providing the wall zone of the elastomeric body with several axial sections of thin wall, thus a valve being obtained which allows great displacements of the sealing element in order to control great volumes of flow.

What I claim is:

1. A flow valve, comprising:
   a) a valve body including a flow inlet and outlet;
   b) a valve seat disposed within an internal portion of said flow inlet;
   c) said valve body including a main cavity having a constant cross-section portion and a broadening portion communicating with said flow inlet and outlet, said main cavity being coaxial with said valve seat;
   d) an elastomeric body having a hollow and open upper portion, said upper portion being disposed within said main cavity; said elastomeric body being slightly compressed in an axial direction such that said elastomeric body exerts a force over said valve seat; said elastomeric body including a first sealing zone, and second radial seal zone;
   e) said first sealing zone being located at a lower base of said elastomeric body, being made of a relatively thick mass body with a slightly smaller cross-section than a cross-section of said main cavity, said first sealing zone being disposed within said broadening portion, said first sealing zone including a lower surface having a slightly greater cross-section than the cross-section of said valve seat, and an upper surface having a cross-section at least equal to the cross-section of said lower surface;
   f) said second radial seal zone being located at said upper portion, and including an external surface having a geometry similar to a side wall surface of said main cavity constant cross-section portion; said external surface being tight against said main cavity side wall surface;
   g) control flow inlet and control flow outlet communicating with said hollow upper portion; and
   h) said first sealing zone being movable axially within said constant cross-section portion, away from or toward said valve seat, when pressure within said hollow upper portion is reduced or increased through said control flow inlet and outlet, thereby to open or close said flow valve.

2. The flow valve of claim 1, wherein said elastomeric body includes a third wall zone located in an intermediate section of said elastomeric body; said third wall zone being made of a relatively thin wall and having a cross-section smaller than said constant cross-section portion and adapted to buckle and transmit axial stresses imposed by the fluid working pressures inside said hollow upper portion.

3. The flow valve of claim 2, wherein said radial seal zone is anchored to a wall of said main cavity.

4. The flow valve of claim 2, wherein said radial seal zone is movable in an axial direction within said constant cross-section portion.

5. The flow valve of claim 2, and further comprising:
   a) a compression spring disposed within said elastomeric body;
   b) one end of said spring being in contact with an internal wall of said first sealing zone; and
   c) the other end of said spring being in contact with said main cavity.

6. The flow valve of claim 5, wherein said radial seal zone is anchored to a wall of said main cavity.

7. The flow valve of claim 5, wherein said radial seal zone is movable in an axial direction within said constant cross-section portion.

8. The flow valve of claim 1, and further comprising:
   a) a compression spring disposed within said elastomeric body;
   b) one end of said spring being in contact with an internal wall of said first sealing zone; and
   c) the other end of said spring being in contact with said main cavity.

9. The flow valve of claim 1, and further comprising:
   a) a movable stem having one end anchored to said first sealing zone; and
   b) the other end of said stem projecting out of said valve body through an opening.

10. The flow valve of claim 9, wherein said elastomeric body includes a third wall zone located in an intermediate section of said elastomeric body; said third wall zone being made of a relatively thin wall and having a cross-section smaller than said constant cross-section portion and adapted to buckle and transmit axial stresses imposed by the fluid working pressures inside said hollow upper portion.

11. The flow valve of claim 10, wherein said radial seal zone is anchored to a wall of said main cavity.

12. The flow valve of claim 10, wherein said radial seal zone is movable in an axial direction within said constant cross-section portion.

13. The flow valve of claim 10, and further comprising:
   a) a compression spring disposed within said elastomeric body;
   b) one end of said spring being in contact with an internal wall of said first sealing zone; and
   c) the other end of said spring being in contact with said main cavity.

14. The flow valve of claim 13, wherein said radial seal zone is anchored to a wall of said main cavity.

15. The flow valve of claim 13, wherein said radial seal zone is movable in an axial direction within said constant cross-section portion.

16. The flow valve of claim 9, and further comprising:
   a) a compression spring disposed within said elastomeric body;
   b) one end of said spring being in contact with an internal wall of said first sealing zone; and
   c) the other end of said spring being in contact with said main cavity.

17. A flow valve, comprising:
   a) a valve body including a flow inlet and outlet;
   b) a valve seat disposed within an internal portion of said flow inlet;
   c) said valve body including a main cavity having a constant cross-section portion and a broadening portion communicating with said flow inlet and outlet, said main cavity being coaxial with said valve seat;
   d) an elastomeric body having a hollow and open upper portion, said upper portion being disposed within said main cavity; said elastomeric body being slightly compressed in an axial direction such that said elastomeric body exerts a force over said valve seat; said elastomeric body including a first sealing zone, and second radial seal zone;
   e) said first sealing zone being located at a lower base of said elastomeric body, being made of a relatively thick mass body with a slightly smaller cross-section than a cross-section of said main cavity, said first sealing zone being disposed within said broadening portion, said first sealing zone including a lower surface having a slightly greater cross-section than the cross-section of said valve seat, and an upper surface having a cross-section at least equal to the cross-section of said lower surface;
   f) said second radial seal zone being located at said upper portion, and including an external surface having a geometry similar to a side wall surface of said main cavity constant cross-section portion; said external surface being tight against said main cavity side wall surface;
   g) control flow inlet and control flow outlet opening communicating with said hollow portion;
   h) a secondary chamber communicating with said control flow outlet opening; and
   i) a movable stem having one end anchored to said first sealing zone and the other end extending out of said valve body through said control flow outlet opening and through said secondary chamber, said stem having a variable cross-section portion along an axial direction such that said control flow outlet opening is completely obstructed when said first sealing zone is engaged against said valve seat, thereby permitting said control flow inlet to increase the pressure within said hollow portion, and said flow control outlet opening is partially open when said first sealing zone is disposed away from said valve seat, thereby reducing the pressure within said hollow upper portion.

18. The flow valve of claim 17, wherein said elastomeric body includes a third wall zone located in an intermediate section of said elastomeric body; said third wall zone being made of a relatively thin wall and having a cross-section smaller than said constant cross-section portion and adapted to buckle and transmit axial stresses imposed by the fluid working pressures inside said hollow portion.

19. The flow valve of claim 18, wherein said radial seal zone is anchored to a wall of said main cavity.

20. The flow valve of claim 18, wherein said radial seal zone is movable in an axial direction within said constant cross-section portion.

21. The flow valve of claim 18, and further comprising:
   a) a compression spring disposed within said elastomeric body;
   b) one end of said spring being in contact with an internal wall of said first sealing zone; and
   c) the other end of said spring being in contact with said main cavity.

22. The flow valve of claim 21, wherein said radial seal zone is anchored to a wall of said main cavity.

23. The flow valve of claim 21, wherein said radial seal zone is movable in an axial direction within said constant cross-section portion.

24. The flow valve of claim 17, and further comprising:
   a) a compression spring disposed within said elastomeric body;
   b) one end of said spring being in contact with an internal wall of said first sealing zone; and
   c) the other end of said spring being in contact with said main cavity.

* * * * *